United States Patent
Harada et al.

(10) Patent No.: US 11,323,061 B2
(45) Date of Patent: May 3, 2022

(54) AC ROTATING ELECTRIC MACHINE CONTROL DEVICE

(71) Applicant: Mitsubishi Electric Corporation, Tokyo (JP)

(72) Inventors: Shingo Harada, Tokyo (JP); Keiichi Enoki, Tokyo (JP); Nozomu Kamioka, Tokyo (JP); Tomohisa Shoda, Tokyo (JP); Yoshimasa Nishijima, Tokyo (JP); Kazuhiko Otsuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/264,900

(22) PCT Filed: Sep. 25, 2018

(86) PCT No.: PCT/JP2018/035431
§ 371 (c)(1),
(2) Date: Feb. 1, 2021

(87) PCT Pub. No.: WO2020/065720
PCT Pub. Date: Apr. 2, 2020

(65) Prior Publication Data
US 2021/0305931 A1  Sep. 30, 2021

(51) Int. Cl.
*H02P 29/68* (2016.01)
*H02P 21/20* (2016.01)
(Continued)

(52) U.S. Cl.
CPC ............ *H02P 29/68* (2016.02); *H02P 21/141* (2013.01); *H02P 21/18* (2016.02); *H02P 21/20* (2016.02); *H02P 21/22* (2016.02); *H02P 27/06* (2013.01)

(58) Field of Classification Search
CPC ........ H02P 29/68; H02P 21/141; H02P 21/18; H02P 21/20; H02P 21/22; H02P 27/06; H02M 1/32; H02M 1/327; H02M 1/0025
See application file for complete search history.

(56) References Cited

U.S. PATENT DOCUMENTS

| 9,595,908 B2 * | 3/2017 | Odaka ...................... H02P 29/68 |
| 10,700,632 B1 * | 6/2020 | Yoo ........................ H02P 29/67 |

(Continued)

FOREIGN PATENT DOCUMENTS

JP  6107936 B2  4/2017

OTHER PUBLICATIONS

International Search Report of PCT/JP2018/035431 dated Dec. 25, 2018 [PCT/ISA/210].

*Primary Examiner* — Bickey Dhakal
(74) *Attorney, Agent, or Firm* — Sughrue Mion, PLLC; Richard C. Turner

(57) ABSTRACT

A control device for an AC rotating electric machine includes: a temperature detection unit configured to detect a temperature of a protection part; a maximum current adjustment unit configured to adjust a maximum current of an AC rotating electric machine so as to prevent the temperature of the protection part from exceeding a set temperature; an allowable torque calculation unit configured to calculate an allowable torque based on the maximum current adjusted; a torque command adjustment unit configured to adjust a torque command value directed to the AC rotating electric machine based on the allowable torque; an upper limit number-of-rotation calculation unit configured to calculate an upper-limit number of rotations of the AC rotating electric machine based on the maximum current adjusted; and a number-of-rotation adjustment unit configured to (Continued)

adjust the number of rotations of the AC rotating electric machine based on the upper-limit number of rotations.

9 Claims, 11 Drawing Sheets

(51) Int. Cl.
*H02P 21/14* (2016.01)
*H02P 27/06* (2006.01)
*H02P 21/18* (2016.01)
*H02P 21/22* (2016.01)

(56) References Cited

U.S. PATENT DOCUMENTS

| | | | |
|---|---|---|---|
| 2009/0072770 A1* | 3/2009 | Son | B60L 3/06 |
| | | | 318/139 |
| 2009/0153087 A1* | 6/2009 | Lim | H02P 29/60 |
| | | | 318/432 |
| 2010/0320951 A1* | 12/2010 | Hasegawa | B60W 10/08 |
| | | | 318/434 |
| 2015/0381101 A1 | 12/2015 | Odaka et al. | |
| 2016/0114801 A1* | 4/2016 | Park | H02P 21/06 |
| | | | 701/22 |
| 2018/0167019 A1* | 6/2018 | Endoh | B62D 6/00 |

\* cited by examiner

AC ROTATING ELECTRIC MACHINE CONTROL DEVICE

CROSS REFERENCE TO RELATED APPLICATIONS

This application is a National Stage of International Application No. PCT/JP2018/035431 filed on Sep. 25, 2018.

TECHNICAL FIELD

The present invention relates to a control device for an AC rotating electric machine.

BACKGROUND ART

In general, an electrically driven vehicle, for example, an electric vehicle or a hybrid vehicle, is mounted with an AC rotating electric machine as a drive source for the vehicle. Moreover, a power conversion device connected to the AC rotating electric machine has a power converting function of converting DC power to AC power in order to supply DC power received from a DC power source to the AC rotating electric machine. Accordingly, the power conversion device is provided with a power conversion circuit formed of switching devices, for example, metal-oxide-semiconductor field-effect transistors (MOSFETs).

Normally, when a temperature of each of the switching devices, for example, the MOSFETs reaches a temperature exceeding a predetermined junction temperature Tj, junction breakdown may occur therein to break down the switching device. Moreover, the AC rotating electric machine may also break down when its temperature exceeds a given temperature. Accordingly, it is required to inhibit a temperature increase so as to prevent the temperature of each of the switching devices and the AC rotating electric machine from exceeding the temperature defined for each thereof in order to protect the switching devices and the AC rotating electric machine from excessive heat.

For example, according to a related-art electric motor control device disclosed in Patent Literature 1, there has been proposed a method involving detecting a temperature of a power semiconductor device and correcting a torque command value so as to eliminate a deviation between the detected temperature and a set temperature.

CITATION LIST

Patent Literature

[PTL 1] JP 6107936 B2

SUMMARY OF INVENTION

Technical Problem

In general, as an AC rotating electric machine to be driven through use of an inverter, a permanent magnet synchronous motor is widely used. As a method of controlling the permanent magnet synchronous motor, two control methods, namely, maximum torque control and flux weakening control, are known. The maximum torque control performs torque control so that a maximum torque can be obtained at an early stage of acceleration.

As an angular speed of the permanent magnet synchronous motor increases, an inductive voltage generated from the permanent magnet synchronous motor also increases. The inductive voltage is applied to both terminals of the DC power source connected to the permanent magnet synchronous motor. When the inductive voltage reaches a limit value of a voltage across the terminals of the DC power source, the control method is changed from the maximum torque control to the flux weakening control.

The flux weakening control reduces field magnetic fluxes to suppress an increase in inductive voltage. In this case, a magnetic field of the permanent magnet synchronous motor cannot directly be weakened, and hence, a negative current is caused to flow in a d-axis armature to cause a d-axis armature reaction, to thereby generate a demagnetization effect.

However, in Patent Literature 1, the negative current flowing through the d-axis armature is not considered, and only the torque command value is simply corrected. Therefore, a current above the allowable value may flow to each switching device in a high-rotation region even when the torque command value is set to zero. As a result, the temperature of each switching device becomes a temperature above the set temperature, and the switching device may thus break down.

The present invention has been made to solve such a problem, and has an object to provide a control device for an AC rotating electric machine capable of preventing a breakdown of a switching device caused by excessive heat.

Solution to Problem

According to one embodiment of the present invention, there is provided a control device for an AC rotating electric machine including: a temperature detection unit configured to detect a temperature of a protection part (to be protected), the temperature increasing in proportion to an increase in a temperature of a switching device of a power conversion circuit connected to the AC rotating electric machine; a maximum current adjustment unit configured to adjust a maximum current of the AC rotating electric machine so as to prevent the temperature of the protection part detected by the temperature detection unit from exceeding a set temperature set in advance; an allowable torque calculation unit configured to calculate an allowable torque based on the maximum current adjusted by the maximum current adjustment unit; a torque command adjustment unit configured to adjust a torque command value directed to the AC rotating electric machine based on the allowable torque; an upper limit number-of-rotation calculation unit configured to calculate an upper-limit number of rotations of the AC rotating electric machine based on the maximum current adjusted by the maximum current adjustment unit; and a number-of-rotation adjustment unit configured to adjust the number of rotations of the AC rotating electric machine based on the upper-limit number of rotations.

Advantageous Effects of Invention

The control device for an AC rotating electric machine according to the present invention can prevent the breakdown of the switching device caused by the excessive heat.

DESCRIPTION OF EMBODIMENTS

Figure 1:
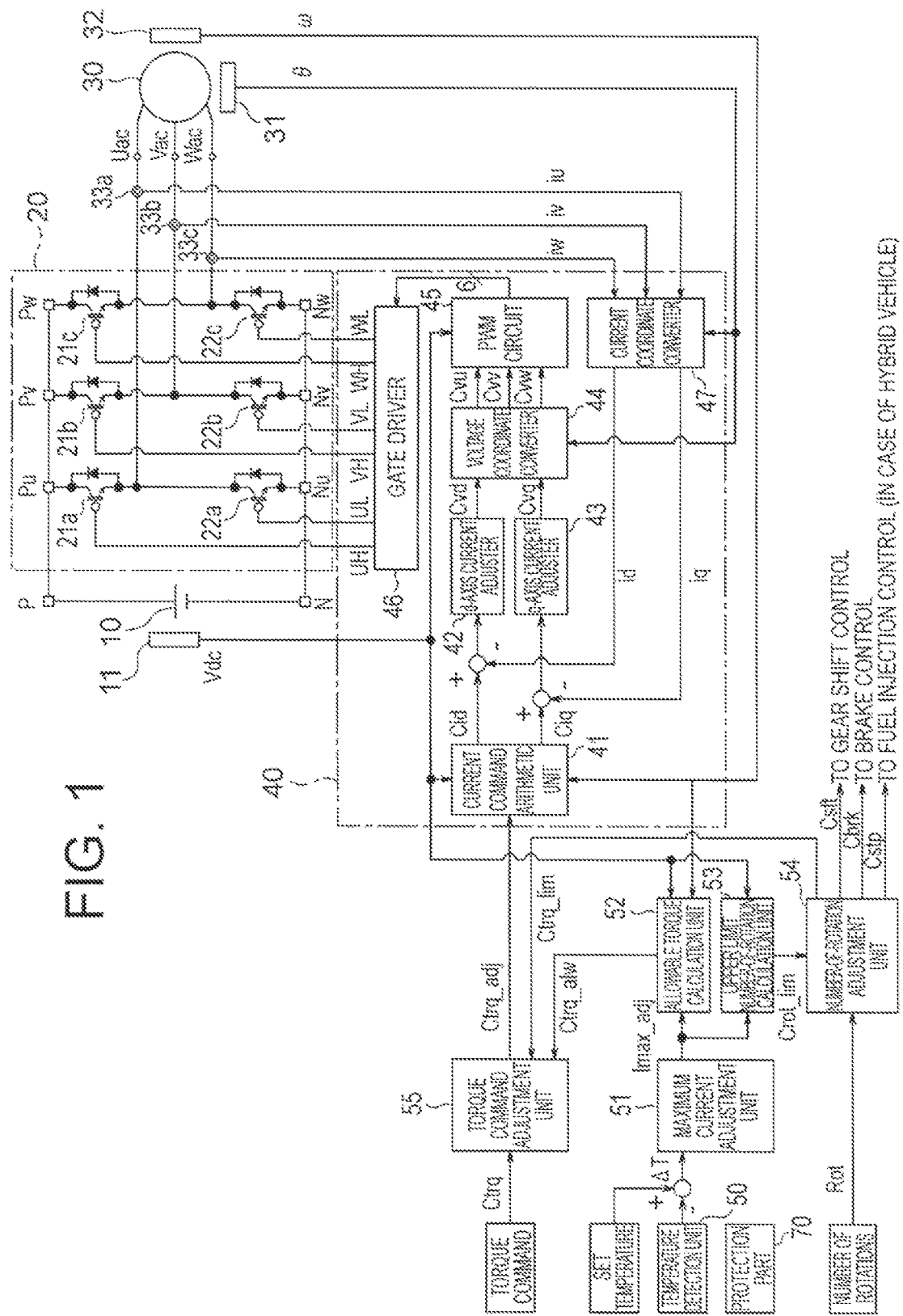
FIG. 1 is a configuration diagram for illustrating a configuration of a control device for an AC rotating electric machine according to a first embodiment of the present invention.

Now, referring to the drawings, a control device for an AC rotating electric machine according to a preferred embodiment of the present invention is described.

First Embodiment

FIG. 1 is a configuration diagram for illustrating a control device for an AC rotating electric machine according to a first embodiment of the present invention. The control device is configured to control an AC rotating electric machine 30. As illustrated in FIG. 1, the control device includes a DC power source 10, a voltage detection unit 11, an inverter 20, a magnetic pole position detection unit 31, an electric angular speed detection unit 32, current sensors 33a to 33c, an inverter control unit 40, a temperature detection unit 50, a maximum current adjustment unit 51, an allowable torque calculation unit 52, an upper limit number-of-rotation calculation unit 53, a number-of-rotation adjustment unit 54, and a torque command adjustment unit 55.

Description is given below of the individual units of the control device illustrated in FIG. 1.

The DC power source 10 is a chargeable/dischargeable power source. The DC power source 10 is configured to supply and receive electric power to and from the AC rotating electric machine 30 via the inverter 20. The DC power source 10 includes a higher-voltage node P and a lower-voltage node N. The DC power source 10 and the inverter 20 are connected via the higher-voltage node P and the lower-voltage node N. It may also be possible to provide a boost converter between the DC power source 10 and the inverter 20 to boost the DC voltage supplied from the DC power source 10 by DC/DC conversion. It may also be possible to connect a smoothing capacitor configured to smooth a DC voltage between the higher-voltage node P and the lower-voltage node N.

The voltage detection unit 11 is configured to detect a DC voltage Vdc from the DC power source 10. Specifically, the voltage detection unit 11 is configured to measure a terminal-to-terminal voltage between the higher-voltage node P and the lower-voltage node N, and to output the measured terminal-to-terminal voltage as the DC voltage Vdc.

As illustrated in FIG. 1, the inverter 20 includes a power conversion circuit including upper-arm power semiconductor devices 21a to 21c and lower-arm power semiconductor devices 22a to 22c. Through switching operations of the upper-arm power semiconductor devices 21a to 21c and the lower-arm power devices 22a to 22c, the inverter 20 converts the high DC voltage received from the DC power source 10 to an AC voltage by DC/AC conversion. The obtained AC voltage is applied to the AC rotating electric machine 30.

In the inverter 20, each of the power semiconductor devices 21a to 21c and 22a to 22c is formed by connecting a semiconductor switching device and a semiconductor rectifier device to each other in antiparallel. Accordingly, a set of the semiconductor switching device and the semiconductor rectifier device is one unit forming each power semiconductor device. As the connection method for the semiconductor switching device and the semiconductor rectifier device, for example, a cathode electrode of the semiconductor rectifier device is connected to a collector electrode of the semiconductor switching device, and an anode electrode of the semiconductor rectifier device is connected to an emitter electrode of the semiconductor switching device. As described above, the semiconductor switching device and the semiconductor rectifier device are connected to each other in antiparallel, to thereby serve as the one unit forming the power semiconductor device.

The AC rotating electric machine 30 controls a driving force and a braking force for the vehicle by applying the AC voltage output from the inverter 20. For example, the AC rotating electric machine 30 is formed of a permanent magnet synchronous motor. In the first embodiment, as an example of the AC rotating electric machine 30, description is given of an AC rotating electric machine provided with three-phase armature winding wires. However, the number of phases of the AC rotating electric machine 30 is not limited to three, and may be any number in total. That is, the control device according to the first embodiment can be applied to an AC rotating electric machine provided with multi-phase armature winding wires.

The magnetic pole position detection unit 31 is configured to detect a position of a magnetic pole in the AC rotating electric machine 30. The magnetic pole position detection unit 31 includes a Hall device or an encoder. The magnetic pole position detection unit 31 is configured to detect a rotation angle of the magnetic pole relative to a reference rotation position of a rotor of the AC rotating electric machine 30, and to output a signal representing a detection value of the detected rotation angle as a magnetic pole position θ. In this configuration, the magnetic pole position θ indicates a rotation angle about a q axis. Moreover, the reference rotation position of the rotor is preliminarily set appropriately to a suitable position.

The electric angular speed detection unit 32 is configured to detect an electric angular speed ω of the AC rotating electric machine 30, and to output a signal representing the detection value of the detected electric angular speed ω as the electric angular speed. The electric angular speed detection unit 32 may include a Hall device or an encoder similarly to the magnetic pole position detection unit 31, or may also be configured to arithmetically determine the electric angular speed ω through use of the magnetic pole position output from the magnetic pole position detection unit 31.

The current sensors 33a to 33c are configured to detect current quantities iU, iV, and iW of currents flowing in a U-phase, a V-phase, and a W-phase, respectively, in the AC rotating electric machine 30, and output the detected current quantities iU, iV, and iW to a current coordinate converter 47. In FIG. 1, the three current sensors are provided to detect the U-phase, V-phase, and W-phase current quantities, respectively, but the configuration is not limited to this case, and the number of the current sensors may be two. In such a configuration, the current quantities are detected in only two phases, and a current quantity in the other one phase is arithmetically determined from the detected current quantities in the two phases.

The inverter control unit 40 is configured to control the switching operations of the semiconductor switching devices in the upper-arm power semiconductor devices 21a to 21c and the lower-arm power semiconductor devices 22a to 22c included in the inverter 20, and control the respective current quantities of the currents flowing through the AC rotating electric machine 30 by adjusting respective potentials at connection nodes Uac, Vac, and Wac between the inverter 20 and the AC rotating electric machine 30. Description is given below of a configuration of the inverter control unit 40.

As illustrated in FIG. 1, the inverter control unit 40 includes a current command arithmetic unit 41, a d-axis current adjuster 42, a q-axis current adjuster 43, a voltage coordinate converter 44, a pulse width modulation (PWM) circuit 45, a gate driver 46, and a current coordinate converter 47. The inverter control unit 40 controls the inverter 20 by performing dq vector control to control rotation of the AC rotating electric machine 30. Description is given below of the individual units forming the inverter control unit 40.

An adjusted torque command value Ctrq_adj for specifying a torque to be generated in the AC rotating electric machine 30 is input from the torque command adjustment unit 55 to the current command arithmetic unit 41. The current command arithmetic unit 41 is configured to arithmetically determine, based on the torque command value Ctrq_adj, a d-axis current command value Cid and a q-axis current command value Ciq, and output the d-axis current command value Cid and the q-axis current command value Ciq to the d-axis current adjuster 42 and the q-axis current adjuster 43, respectively.

The current coordinate converter 47 is configured to convert the three-phase current quantities iU, iV, and iW received from the current sensors 33a to 33c to two-phase current quantities, namely, a d-axis current value id and a q-axis current value iq. The current coordinate converter 47 is configured to output the d-axis current value id and the q-axis current value iq to the d-axis current adjuster 42 and the q-axis current adjuster 43, respectively.

The d-axis current adjuster 42 is configured to arithmetically determine a DC d-axis voltage command value Cvd so that a deviation between the d-axis current command value Cid received from the current command arithmetic unit 41 and the d-axis current value id received from the current coordinate converter 47 is "0", and to output the d-axis voltage command value Cvd to the voltage coordinate converter 44.

The q-axis current adjuster 43 is configured to arithmetically determine a DC q-axis voltage command value Cvq so that a deviation between the q-axis current command value Ciq received from the current command arithmetic unit 41 and the q-axis current value iq received from the current coordinate converter 47 is "0", and output the q-axis voltage command value Cvq to the voltage coordinate converter 44.

The voltage coordinate converter 44 is configured to convert, based on the magnetic pole position 9 received from the magnetic pole position detection unit 31, the two-phase DC d-axis and q-axis voltage command values Cvd and Cvq to three-phase AC voltage command values Cvu, Cvv, and Cvw, and to output the three-phase AC voltage command values Cvu, Cvv, and Cvw to the PWM circuit 45.

The PWM circuit 45 is configured to generate control signals for controlling the respective switching devices in the upper-arm power semiconductor devices 21a to 21c and the lower-arm power semiconductor devices 22a to 22c included in the inverter 20, and to output the control signals to the gate driver 46.

The gate driver 46 is configured to control, based on the individual control signals received from the PWM circuit 45, the switching operations of the semiconductor switching devices in the upper-arm power semiconductor devices 21a to 21c and the lower-arm power semiconductor devices 22a to 22c, to thereby perform DC/AC conversion in the inverter 20.

The temperature detection unit 50 is configured to detect a temperature of a protection part 70 (to be protected). The protection part 70 is a member the temperature of which increases in proportion to increases in the temperature of the switching device included in each of the power semiconductor devices 21a to 21c and 22a to 22c of the inverter 20, and increases in the temperatures of coils and a magnet included in the AC rotating electric machine. The protection part 70 is provided in order to prevent those switching devices, coils, and the magnet from breaking down due to excessive heat. Description is given below of the protection part 70. When the excessive heat of the switching devices is to be prevented, the protection part 70 is provided, for example, on the same substrate on which the switching devices are mounted. The protection part 70 and the switching devices are in the same environment, and therefore the temperature of the protection part 70 increases in proportion to increases in the temperatures of the switching devices. Accordingly, when the temperature of the protection part 70 can be controlled so as not to exceed a set temperature set in advance, it is also possible to prevent the switching devices from breaking down due to the excessive heat. As described above, it is only required to provide the protection part 70 in the same environment as that of a member to be prevented from being excessively heated, but the configuration is not limited to this example. The temperature detection unit 50 includes a temperature sensor or the like, and directly detects the temperature of the protection part 70. Alternatively, the temperature detection unit 50 obtains an estimated value of the temperature of the protection part 70 by using predetermined calculations. In such a case, for example, the temperature detection unit 50 calculates the estimated value of the temperature of the protection part 70 by using an calculation according to an estimation algorithm for estimating the junction temperature. The estimation algorithm for estimating the junction temperature is publicly known, and description thereof is therefore omitted. Moreover, other estimation algorithms may be used to estimate the temperature of the protection part 70.

The maximum current adjustment unit 51 is configured to adjust a maximum current Imax based on the temperature of the protection part 70 detected by the temperature detection unit 50, and to output an adjusted maximum current Imax_adj. The maximum current adjustment unit 51 is configured to adjust the value of the maximum current Imax based on the temperature of the protection part 70 so that the temperature of the protection part 70 detected by the temperature detection unit 50 does not exceed the set value set in advance. With this configuration, the increases in the temperatures of the switching devices of the inverter 20 are suppressed, to thereby be able to prevent the switching devices from breaking down due to the excessive heat. With reference to FIG. 3 to FIG. 8, description is later given of a specific configuration and operation of the maximum current adjustment unit 51.

The allowable torque calculation unit 52 is configured to calculate an allowable torque Ctrq_alw based on the adjusted maximum current Imax_adj output from the maximum current adjustment unit 51. Description is later given of a calculation method for the allowable torque Ctrq_alw by the allowable torque calculation unit 52.

Description is now given of the maximum current Imax_adj to be output by the maximum current adjustment unit 51. The maximum current Imax_adj is a maximum value allowed at the present time for a phase current absolute value given by Expression (1).

$$\text{(Phase current absolute value)} = \sqrt{(d\text{-axis current value})^2 + (q\text{-axis current value})^2} \quad (1)$$

For example, when the adjusted maximum current Imax_adj output from the maximum current adjustment unit 51 is 500 A, the allowable torque calculation unit 52 calculates a torque at which the phase current absolute value is the maximum under a condition that which the phase current absolute value is equal to or smaller than 500 A. Accordingly, when the torque command value within a range of the allowable torque is input, the d-axis current command value Cid and the q-axis current command value Ciq, which are output from the current command arithmetic unit 41, basically satisfy a condition given by Expression (2).

$$\sqrt{(d\text{-axis current command value } Cid)^2 + (q\text{-axis current command value } Ciq)^2} \leq 500A \quad (2)$$

The d-axis current and the q-axis current are feedback-controlled to the command values. Accordingly, by setting each of absolute values of the d-axis current command value and the q-axis current command value to a value equal to or smaller than the maximum current Imax_adj, it is also possible to control the phase current absolute value to a value equal to or smaller than the maximum current.

The upper limit number-of-rotation calculation unit 53 is configured to calculate an upper-limit number of rotations Crot_lim based on the adjusted maximum current Imax_adj output from the maximum current adjustment unit 51. Description is later given of a calculation method for the upper-limit number of rotations Crot_lim by the upper limit number-of-rotation calculation unit 53.

The number-of-rotation adjustment unit 54 is configured to adjust the number of rotations Rot of the AC rotating electric machine 30 based on the upper limit number-of-rotation Crot_lim output from the upper limit number-of-rotation calculation unit 53. The number-of-rotation adjustment unit 54 outputs a control command value for suppressing the number or rotations Rot when the number of rotations Rot of the AC rotating electric machine 30 has reached the upper-limit number of rotations Crot_lim. Description is later given of the control command value.

The torque command adjustment unit 55 is configured to adjust the torque command value Ctrq for the AC rotating electric machine 30 so that the torque command value Ctrq is within a range of the allowable torque Ctrq_alw output from the allowable torque calculation unit 52. The torque command adjustment unit 55 is configured to output the adjusted torque command value Ctrq_adj to the current command arithmetic unit 41. Moreover, when the torque command adjustment unit 55 receives a torque control command value Ctrq_lim for setting the torque command value to "0" from the number-of-rotation adjustment unit 54, the torque command adjustment unit 55 sets the adjusted torque command value Ctrq_adj to "0", and outputs the adjusted torque command value Ctrq_adj to the current command arithmetic unit 41.

With reference to a flow chart of FIG. 2, description is given below of operations of the maximum current adjustment unit 51, the allowable torque calculation unit 52, the upper limit number-of-rotation calculation unit 53, the number-of-rotation adjustment unit 54, and the torque command adjustment unit 55 of the control device illustrated in FIG. 1.

First, in Step S100, the control by the control device illustrated in FIG. 1 is started.

In Step S101, the temperature of the protection part 70 is obtained by the temperature detection unit 50. Simultaneously, in Step S102 and Step S103, the torque command value Ctrq and the number of rotations Rot of the AC rotating electric machine 30 are obtained, respectively.

Then, in Step S104, a temperature deviation ΔT between the detected temperature obtained in Step S101 and the set temperature set in advance is calculated by a subtractor, and the control proceeds to Step S105.

In Step S105, the maximum current Imax is adjusted by the maximum current adjustment unit 51 based on the temperature deviation ΔT. The maximum current adjustment unit 51 adjusts the maximum current Imax so that the temperature of the protection part 70 does not exceed the set temperature based on the temperature deviation ΔT. The maximum current adjustment unit 51 includes a proportional adjuster 60 and an integral adjuster 61. The maximum current adjustment unit 51 is configured, for example, as one of three configuration examples of FIG. 3 to FIG. 5 described below.

Figure 3:
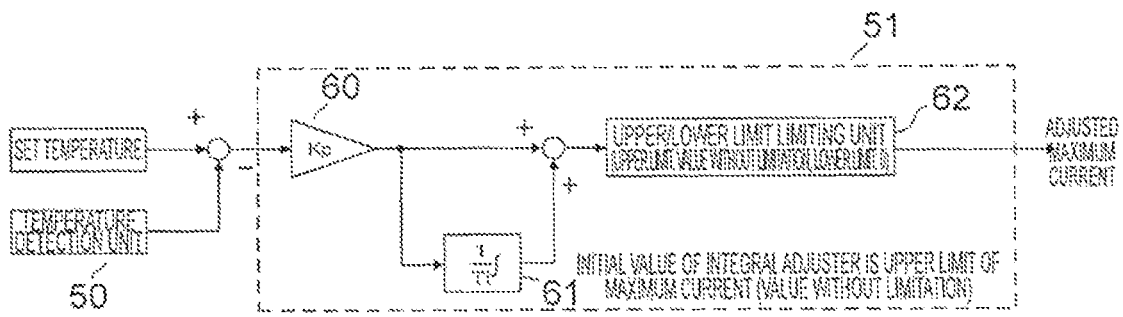
FIG. 3 is a configuration diagram for illustrating a configuration of a first configuration example of a maximum current adjustment unit in the first embodiment of the present invention.

In FIG. 3, a configuration of a first configuration example of the maximum current adjustment unit 51 is illustrated. In the first configuration example of FIG. 3, the maximum current adjustment unit 51 includes the proportional adjuster 60, the integral adjuster 61, and an upper/lower limit limiting unit 62. The deviation between the set temperature set in advance and the detected temperature of the protection part 70 detected by the temperature detection unit 50 is input to the maximum current adjustment unit 51. The deviation is a value obtained by subtracting the detected temperature from the set temperature. Accordingly, when the detected temperature is higher than the set temperature, the value of the deviation is a negative value. Thus, in this case, as the detected temperature increases, the value of the deviation decreases.

In the first configuration example of FIG. 3, it is assumed that a proportional gain Kp of the proportional adjuster 60 is a positive value. The proportional adjuster 60 outputs a value obtained by multiplying the input deviation by the proportional gain Kp.

In the first configuration example of FIG. 3, an initial value of the integral adjuster 61 is set to an upper limit value of the maximum current Imax, and the output of the proportional adjuster 60 is integrated. In this case, the upper limit value of the maximum current Imax indicates a value exhibited during a non-limitation period. The upper limit value of the maximum current Imax is a design upper limit value of the phase current absolute value given by Expression (1). The upper limit value of the maximum current Imax is a value mainly determined based on a loss occurring in the switching devices and by cooling performance, and is basically a constant value. A current having the phase current absolute value larger than the upper limit value of the maximum current Imax is not intentionally caused to flow under any condition. Meanwhile, the maximum current is the value that varies as described above. An adjustment range of the maximum current is between zero and the upper limit value of the maximum current Imax.

A reason for setting the initial value of the integral adjuster 61 to the upper limit value of the maximum current Imax is that the torque can be reliably output immediately after the activation of the inverter 20. In the first configuration example of FIG. 3, the maximum current is adjusted by the feedback control, and hence, after the activation, a given period of time is required before the maximum current reaches an appropriate value. Accordingly, when the initial value of the integral adjuster 61 is set to, for example, zero, even though the temperature of the protection part 70 is low and no protection is required, the maximum current immediately after the activation is a small value, and therefore a sufficient torque cannot be output. This presents a problem when, for example, an engine is started through use of the AC rotating electric machine. Meanwhile, when the initial value of the integral adjuster 61 is set to the upper limit value of the maximum current Imax, even after the activation of the inverter 20 under a state in which the temperature of the protection part 70 is higher than the set value, the protection can reliably be provided.

In the first configuration of FIG. 3, when the detected temperature of the protection part 70 detected by the temperature detection unit 50 becomes higher than the set temperature, the output of the proportional adjuster 60 becomes a negative value, and the output of the integral adjuster 61 accordingly decreases. Specifically, when the detected temperature is higher than the set temperature, the deviation is a negative value. The proportional adjuster 60 outputs a value obtained by multiplying the deviation by the proportional gain Kp. Therefore, when the deviation is the negative value, the output of the proportional adjuster 60 is a negative value. Moreover, the integral adjuster 61 integrates the negative value, and the output of the integral adjuster 61 thus gradually decreases from the initial value. Meanwhile, when the detected temperature of the protection part 70 is equal to or lower than the set temperature, the output of the proportional adjuster 60 is a positive value, and the output of the integral adjuster 61 accordingly increases. In the configuration example of FIG. 3, the output of the proportional adjuster 60 and the output of the integral adjuster 61 are added to each other by an adder. An output of the adder serves as an output value for proportional/integral compensation. As described above, the proportional adjuster 60 and the integral adjuster 61 perform the proportional/integral compensation for the deviation.

In the first configuration example of FIG. 3, upper limit limitation and lower limit limitation for the output value of the proportional/integral compensation are then performed in the upper/lower limit limiting unit 62. In the upper/lower limit limiting unit 62, the upper limit value is set to the upper limit value of the maximum current Imax, and the lower limit value is set to "0". The upper/lower limit limiting unit 62 uses the upper limit value and the lower limit value to limit the upper limit and the lower limit of the output value of the proportional/integral compensation, to thereby calculate the adjusted maximum current Imax_adj. Specifically, an addition result of the addition of the output of the proportional adjuster 60 and the output of the integral adjuster 61 by the adder is input to the upper/lower limit limiting unit 62. When the addition result is equal to or smaller than the upper limit value and equal to or larger than the lower limit value, the upper/lower limit limiting unit 62 outputs the addition result kept unchanged as the adjusted maximum current Imax_adj. Meanwhile, when the addition result is larger than the upper limit value, the upper/lower limit limiting unit 62 outputs the upper limit value as the adjusted maximum current Imax_adj. Moreover, when the addition result is smaller than the lower limit value, the upper/lower limit limiting unit 62 outputs the lower limit value as the adjusted maximum current Imax_adj.

In the first configuration example of FIG. 3, the upper limit value is set to the upper limit value of the maximum current Imax, and the adjusted maximum current Imax_adj does not thus exceed the upper limit value of the maximum current Imax. Moreover, the lower limit value is set to "0", and the adjusted maximum current Imax_adj can thus be prevented from becoming a negative value.

Figure 4:
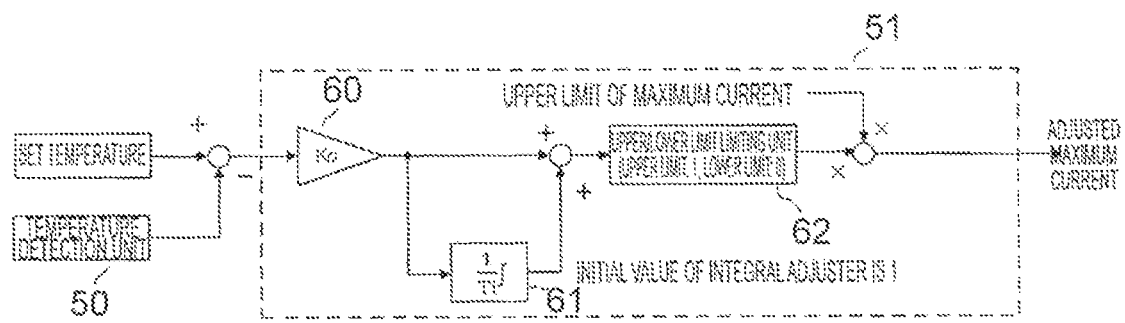
FIG. 4 is a configuration diagram for illustrating a configuration of a second configuration example of the maximum current adjustment unit in the first embodiment of the present invention.

In FIG. 4, a configuration of a second configuration example of the maximum current adjustment unit 51 is illustrated. In the second configuration example of FIG. 4, the maximum current adjustment unit 51 includes the proportional adjuster 60, the integral adjuster 61, and the upper/lower limit limiting unit 62. The deviation between the set temperature set in advance and the detected temperature of the protection part 70 detected by the temperature detection unit 50 is input to the maximum current adjustment unit 51. Description is given below mainly of operations different from those in the first configuration example of FIG. 3.

In the second configuration example of FIG. 4, the initial value of the integral adjuster 61 is set to 1, and the proportional/integral compensation is performed by the proportional adjuster 60 and the integral adjuster 61. Moreover, in the upper/lower limit limiting unit 62, the upper/lower limit is limited is performed under a state in which the upper limit value is set to "1" and the lower limit value is set to "0". Further, a product of the output of the upper/lower limit limiting unit 62 and the upper limit value of the maximum current Imax is calculated by a multiplier, and the calculation result is output as the adjusted maximum current Imax_adj. Specifically, when the addition result of the addition of the output of the proportional adjuster 60 and the output of the integral adjuster 61 by the adder is equal to or smaller than the upper limit value and equal to or larger than the lower limit value, a product of the addition result and the upper limit value of the maximum current Imax is calculated. Meanwhile, when the addition result is larger than the upper limit value, a product of the upper limit value and the upper limit value of the maximum current Imax is calculated. Moreover, when the addition result is smaller than the lower limit value, a product of the lower limit value and the upper limit value of the maximum current Imax is calculated.

In the second configuration example of FIG. 4, the upper limit value is set to 1, and the adjusted maximum current Imax_adj does not thus exceed the upper limit value of the maximum current Imax. Moreover, the lower limit value is set to 0, and the adjusted maximum current Imax_adj can be prevented from becoming a negative value.

Figure 5:
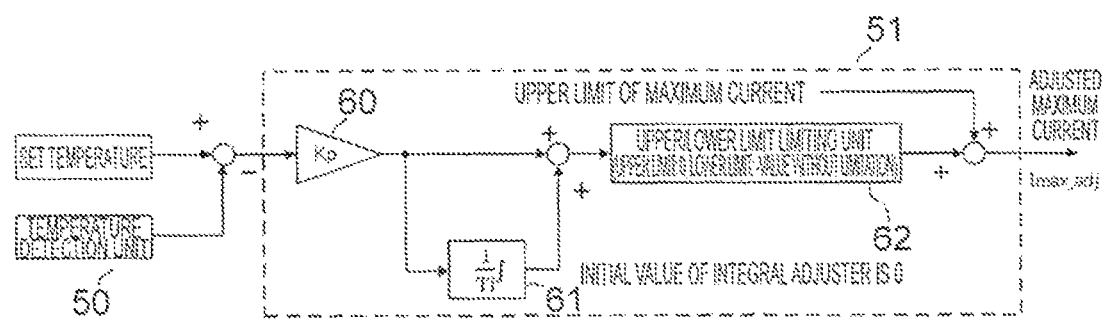
FIG. 5 is a configuration diagram for illustrating a configuration of a third configuration example of the maximum current adjustment unit in the first embodiment of the present invention.

In FIG. 5, a configuration of a third configuration example of the maximum current adjustment unit 51 is illustrated. In the third configuration example of FIG. 5, the maximum current adjustment unit 51 includes the proportional adjuster 60, the integral adjuster 61, and the upper/lower limit limiting unit 62. The deviation between the set temperature set in advance and the detected temperature of the protection part 70 detected by the temperature detection unit 50 is input to the maximum current adjustment unit 51. Description is given below mainly of operations different from those in the first configuration example of FIG. 3.

In the third configuration example of FIG. 5, the initial value of the integral adjuster 61 is set to "0", and the proportional/integral compensation is performed. Moreover, in the upper/lower limit limiting unit 62, the upper limit value is set to "0", and the lower limit value is set to a value obtained by multiplying the upper limit value of the maximum current Imax by "−1". Further, a sum of the output of the upper/lower limit limiting unit 62 and the upper limit value of the maximum current Imax is calculated by an adder, and the calculation result is output as the adjusted maximum current Imax_adj. Specifically, when the addition result of the addition of the output of the proportional adjuster 60 and the output of the integral adjuster 61 by the adder is equal to or smaller than the upper limit value and equal to or larger than the lower limit value, a sum of the addition result and the upper limit value of the maximum current Imax is calculated. Meanwhile, when the addition result is larger than the upper limit value, a sum of the upper limit value and the upper limit value of the maximum current Imax is calculated. Moreover, when the addition result is smaller than the lower limit value, a sum of the lower limit value and the upper limit value of the maximum current Imax is calculated.

In the third configuration example of FIG. 5, the upper limit value is set to 0, and the adjusted maximum current Imax_adj does not thus exceed the upper limit value of the maximum current Imax. Moreover, the lower limit value is set to the value obtained by multiplying the upper limit value of the maximum current Imax by "−1", and it is thus possible to prevent the adjusted maximum current Imax_adj from becoming a negative value.

Figure 6:
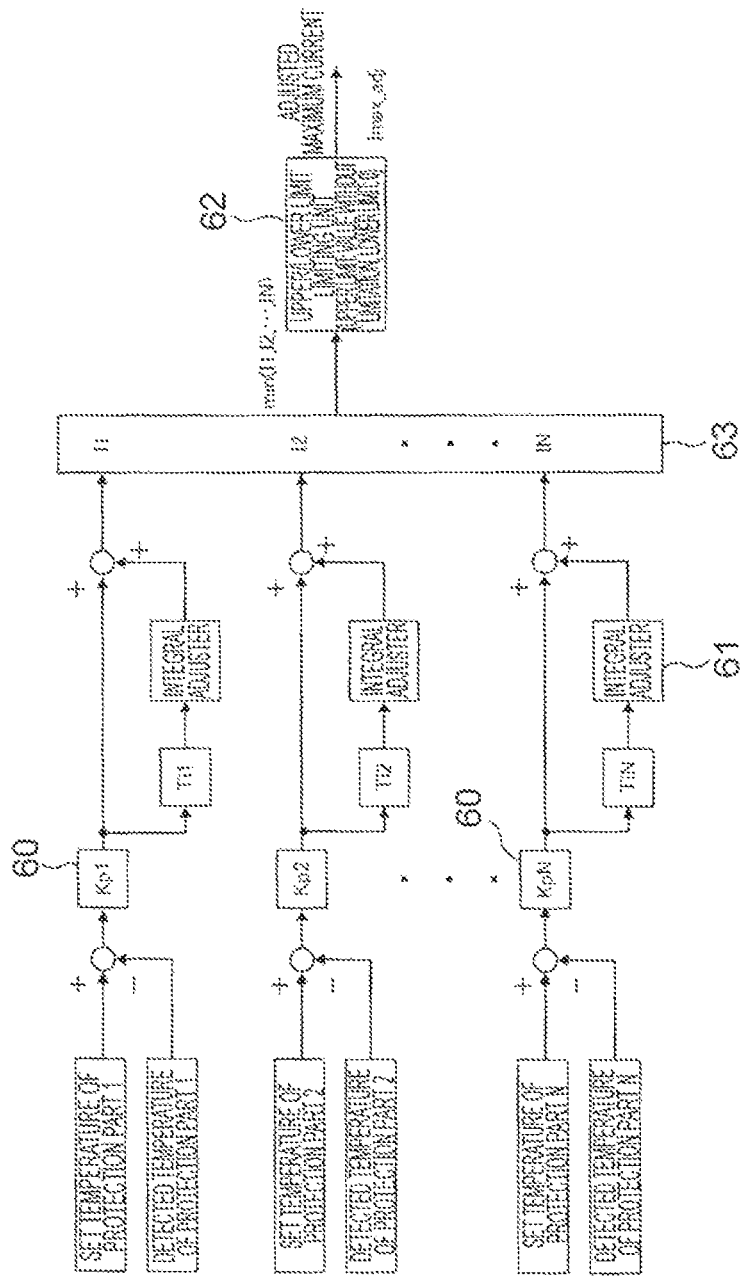
FIG. 6 is a configuration diagram for illustrating a configuration of a fourth configuration example of the maximum current adjustment unit in the first embodiment of the present invention.
Figure 7:
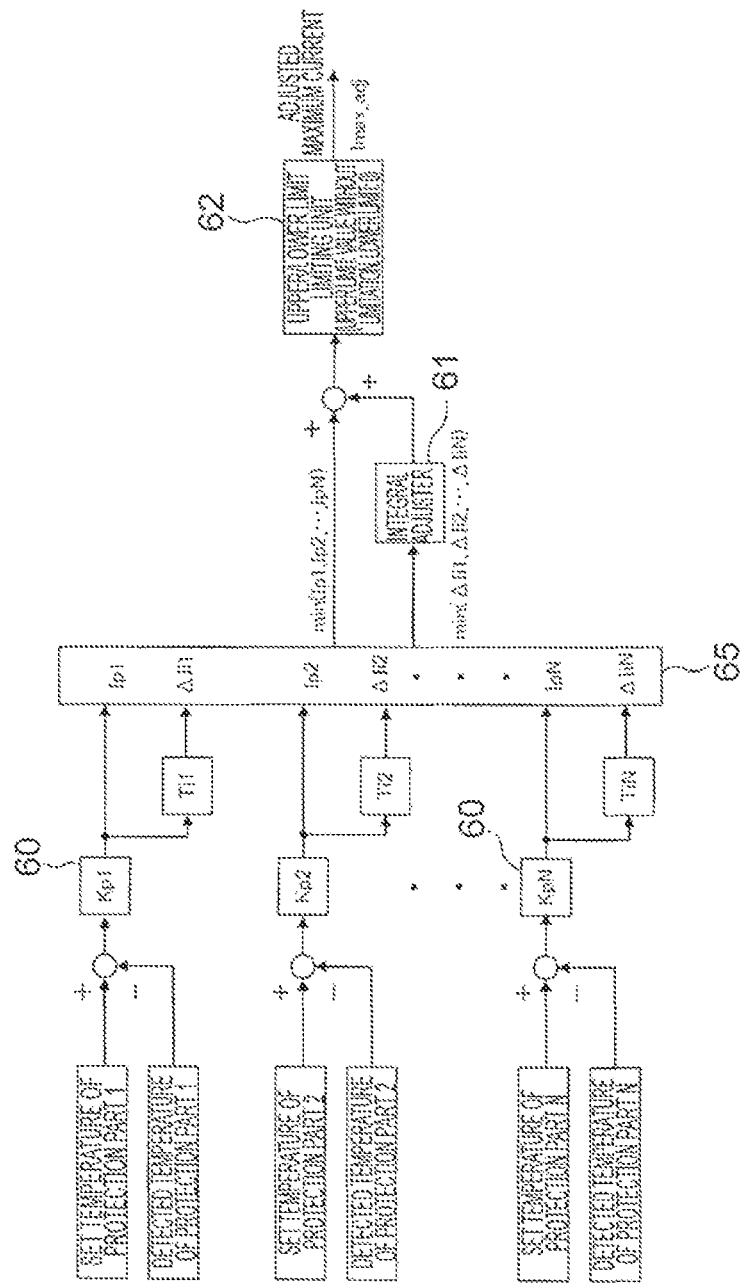
FIG. 7 is a configuration diagram for illustrating a configuration of a fifth configuration example of the maximum current adjustment unit in the first embodiment of the present invention.
Figure 8:
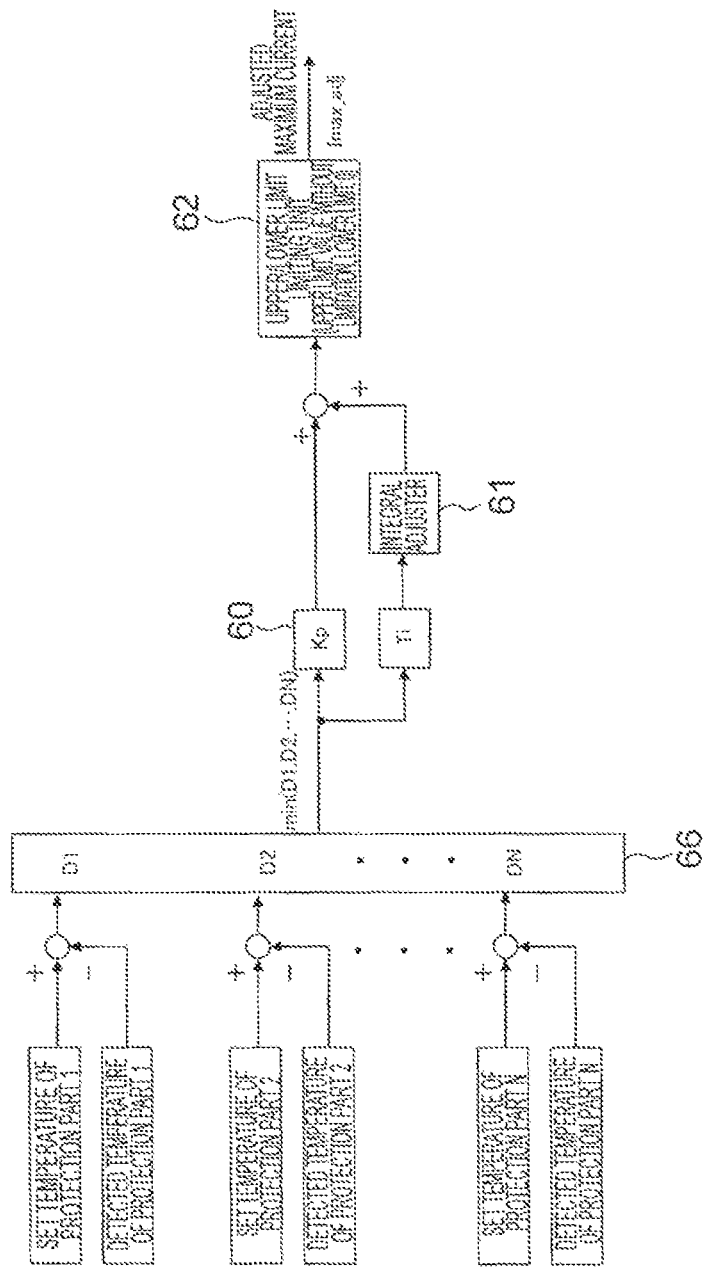
FIG. 8 is a configuration diagram for illustrating a configuration of a sixth configuration example of the maximum current adjustment unit in the first embodiment of the present invention.

Moreover, when a plurality of protection parts 70 and a plurality of temperature detection units 50 exist, a detected temperature most requiring the protection is selected from the detected temperatures detected by the temperature detection units 50. Referring to examples of FIG. 6 to FIG. 8, description is later given of "the detected temperature most requiring the protection". The maximum current adjustment unit 51 adjusts the maximum current Imax based on the selected detected temperature. In FIG. 6 to FIG. 8, there are illustrated three configuration examples in which the plurality of protection parts 70 and the plurality of temperature detection units 50 exist. The configuration examples of FIG. 6 to FIG. 8 are hereinafter referred to as fourth configuration example, fifth configuration example, and sixth configuration example, respectively. In FIG. 6 to FIG. 8, description is given of the configuration of the first configuration example of FIG. 3 as a basic configuration of the maximum current adjustment unit 51, but the basic configuration is not limited to this case, and may be that of the second configuration example of FIG. 4 or that of the third configuration example of FIG. 5.

In FIG. 6, as the fourth configuration example, there is illustrated a configuration example in which a plurality of protection parts 70 and a plurality of temperature detection units 50 exist. In the fourth configuration example of FIG. 6, the maximum current adjustment unit 51 includes the proportional adjuster 60, the integral adjuster 61, the upper/lower limit limiting unit 62, and a minimum value calculation unit 63. Each deviation between the set temperature set in advance to each protection part 70 and the detected temperature of each protection part 70 detected by each temperature detection unit 50 is input to the maximum current adjustment unit 51.

In the fourth configuration example illustrated in FIG. 6, for each input deviation, the proportional/integral compensation is performed by the proportional adjuster 60 and the integral adjuster 61. Moreover, the minimum value calculation unit 63 is configured to select the minimum output value from among the output values of the proportional/integral compensation, and to output the minimum output value. That is, "the detected temperature most requiring the protection" in this case corresponds to the smallest value among values (I1, I2, . . . , IN) input to the minimum value calculation unit 63. That is, the value selected as "the detected temperature most requiring the protection" by the minimum value calculation unit 63 is min (I1, I2, . . . , IN). Moreover, the upper/lower limit limiting unit 62 adjusts the maximum current Imax by limiting the upper/lower limit of the output value received from the minimum value calculation unit 63, and output the adjusted maximum current Imax_adj.

In the fourth configuration example of FIG. 6, the upper limit value is set to the upper limit value of the maximum current Imax, and the adjusted maximum current Imax_adj does not thus exceed the upper limit value of the maximum current Imax. Moreover, the lower limit value is set to 0, and the adjusted maximum current Imax_adj can thus be prevented from becoming a negative value.

In FIG. 7, as the fifth configuration example, there is illustrated a configuration example in which a plurality of protection parts 70 and a plurality of temperature detection units 50 exist. In the fifth configuration example of FIG. 7, the maximum current adjustment unit 51 includes the proportional adjuster 60, the integral adjuster 61, the upper/lower limit limiting unit 62, and a minimum value calculation unit 65. Each deviation between the set temperature set in advance to each protection part 70 and the detected temperature of each protection part 70 detected by each temperature detection unit 50 is input to the maximum current adjustment unit 51.

In the fifth configuration example of FIG. 7, the minimum value calculation unit 65 is configured to select the minimum output value from among the output values of the proportional adjusters 60, and to output the minimum output value. That is, "the detected temperature most requiring the protection" in this case corresponds to the smallest value among values (Ip1, Ip2, . . . , IpN) input to the minimum value calculation unit 65 and the smallest value among values (ΔIi1, ΔIi2, . . . , ΔIiN) input to the minimum value calculation unit 65. That is, the values selected by the minimum value calculation unit 65 as "the detected temperature most requiring the protection" are min (Ip1, Ip2, . . . , IpN) and min (ΔIi1, ΔIi2, . . . , ΔIiN). The integral adjuster 61 uses the output value min (ΔIi1, ΔIi2, . . . , ΔIiN) output from the minimum value calculation unit 65 to perform the integration. After that, the output value min (Ip1, Ip2, . . . , IpN) output from the minimum value calculation unit 65 and an output value received from the integral adjuster 61 are added to each other by an adder, and an addition result is output as the output value for the proportional/integral compensation. The upper/lower limit limiting unit 62 sets the upper limit value to the upper limit value of the maximum current Imax, and sets the lower limit value to "0". The upper/lower limit limiting unit 62 uses the upper limit value and the lower limit value to limit the upper limit and the lower limit of the output value of the proportional/integral compensation to adjust the maximum current Imax, and outputs the adjusted maximum current Imax_adj.

In the fifth configuration example of FIG. 7, the upper limit value is set to the upper limit value of the maximum current Imax, and the adjusted maximum current Imax_adj does not thus exceed the upper limit value of the maximum current Imax. Moreover, the lower limit value is set to 0, and the adjusted maximum current Imax_adj can thus be prevented from becoming a negative value.

In FIG. 8, as the sixth configuration example, there is illustrated a configuration example in which a plurality of protection parts 70 and a plurality of temperature detection units 50 exist. In the sixth configuration example of FIG. 8, the maximum current adjustment unit 51 includes the proportional adjuster 60, the integral adjuster 61, the upper/lower limit limiting unit 62, and a minimum value calculation unit 66. Each temperature deviation ΔT between the set temperature set in advance to each protection part 70 and the detected temperature of each protection part 70 detected by each temperature detection unit 50 is input to the maximum current adjustment unit 51.

In the sixth configuration example of FIG. 8, the minimum value calculation unit 66 is configured to select a minimum input value from among the temperature deviations ΔT input to the maximum current adjustment unit 51 and to output the minimum input value. That is, "the detected temperature most requiring the protection" in this case corresponds to the smallest value among values (D1, D2, . . . , DN) input to the minimum value calculation unit 66, that is, a minimum value of the values each obtained by subtracting the detected temperature from the set temperature. Accordingly, the value selected by the minimum value calculation unit 66 as "the detected temperature most requiring the protection" is min (D1, D2, . . . , DN). The proportional adjuster 60 is configured to output a value obtained by multiplying the output value of the minimum value calculation unit 66 by the proportional gain Kp. Moreover, the integral adjuster 61 is configured to integrate the output of the minimum value calculation unit 66. After that, the output value of the proportional adjuster 60 and the output value of the integral adjuster 61 are added to each other by an adder. The upper/lower limit limiting unit 62 is configured to set the upper limit value to the upper limit value of the maximum current Imax, and to set the lower limit value to "0". The upper/lower limit limiting unit 62 uses the upper limit value and the lower limit value to limit the upper limit and the lower limit of the output value of the proportional/integral compensation to adjust the maximum current Imax, and outputs the adjusted maximum current Imax_adj.

In the sixth configuration example of FIG. 8, the upper limit value is set to the upper limit value of the maximum current Imax, and the adjusted maximum current Imax_adj does not thus exceed the upper limit value of the maximum current Imax. Moreover, the lower limit value is set to 0, and the adjusted maximum current Imax_adj can thus be prevented from becoming a negative value.

Referring back to FIG. 2, in Step S105, the maximum current adjustment unit 51 adjusts the maximum current Imax in one of the above-mentioned configuration examples illustrated in FIG. 3 to FIG. 8, and outputs the adjusted maximum current Imax_adj, and the control then proceeds to Step S106.

In Step S106, the allowable torque calculation unit 52 calculates the allowable torque Ctrq_alw, and the upper limit number-of-rotation calculation unit 53 calculates the upper-limit number of rotations Crot_lim. Description is given below of calculation methods for the respective values.

Figure 9:
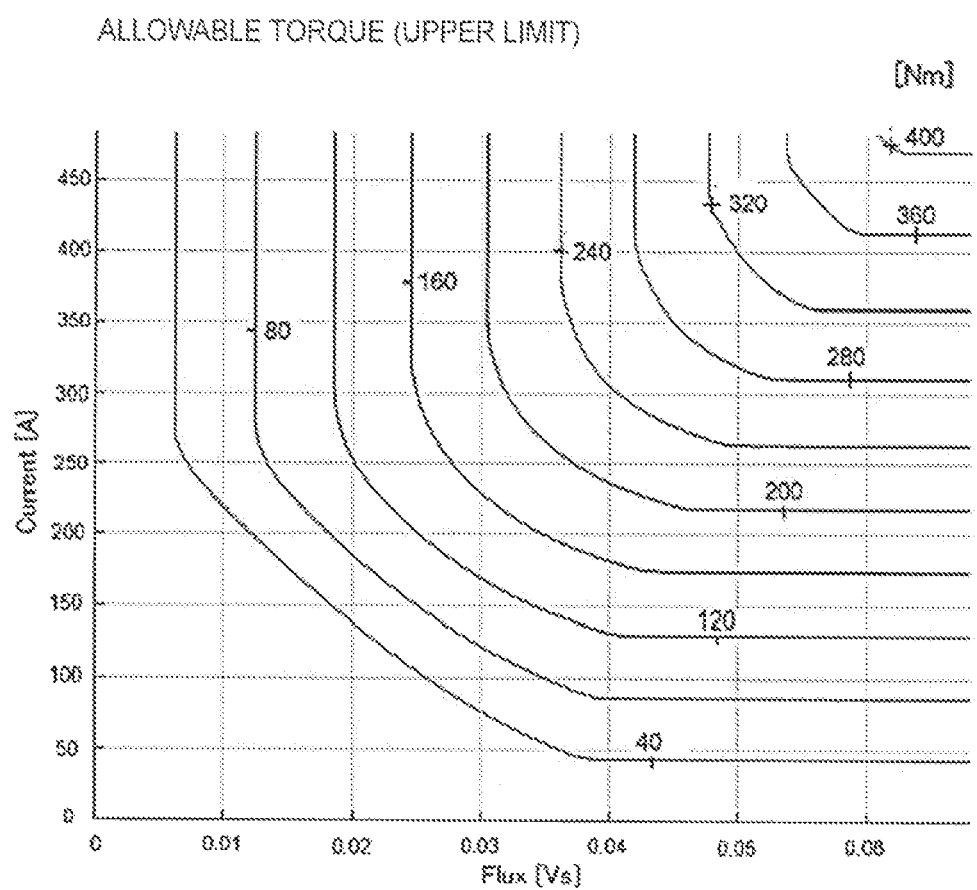
FIG. 9 is an explanatory table for showing a calculation method for an upper limit value of an allowable torque by an allowable torque calculation unit in the first embodiment of the present invention.
Figure 10:
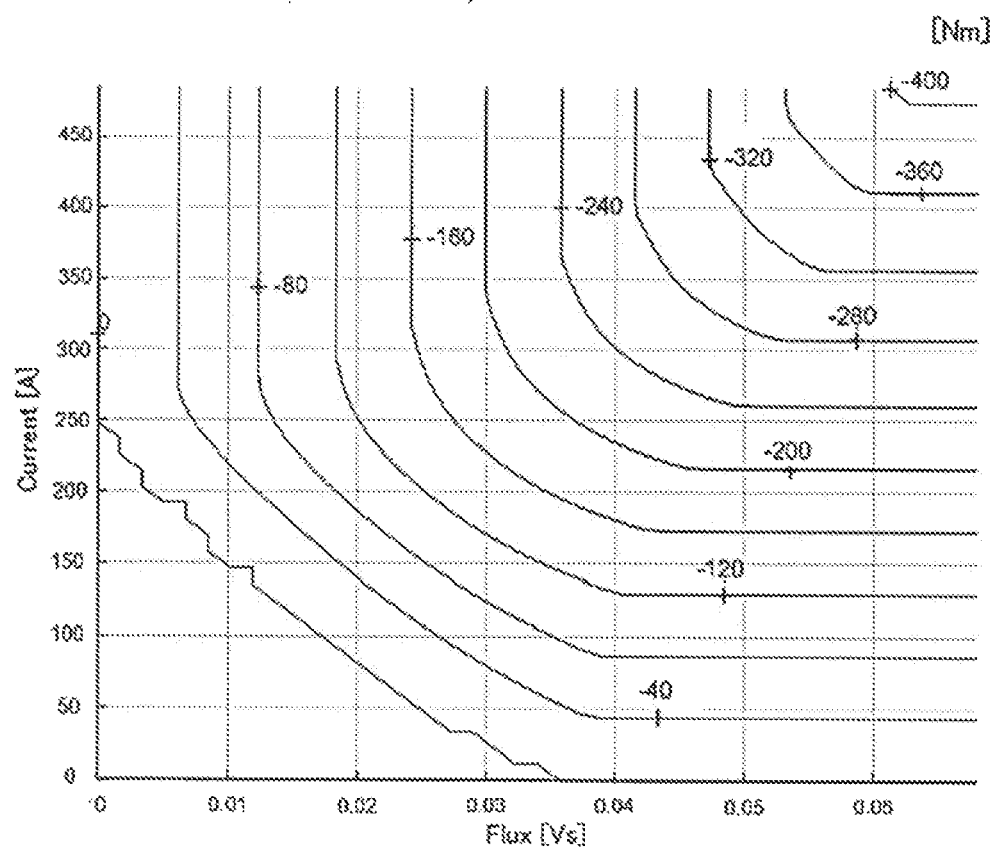
FIG. 10 is an explanatory table for showing a calculation method for a lower limit value of the allowable torque by the allowable torque calculation unit in the first embodiment of the present invention.

The allowable torque calculation unit 52 first uses the DC voltage Vdc detected by the voltage detection unit 11 and a maximum modulation factor MFmax set in advance to arithmetically determine a maximum voltage Vmax based on an arithmetic expression of "Vmax=sqrt(3/2)×Vdc×(½)× MFmax". Then, the allowable torque calculation unit 52 uses the maximum voltage value Vmax and the electric angular speed ω received from the electric angular speed detection unit 32 to arithmetically determine a maximum interlinkage magnetic flux FLmax based on an arithmetic expression of "FLmax=Vmax+w". Moreover, the allowable torque calculation unit 52 obtains an upper limit value Ctrq_alw_upper and a lower limit value Ctrq_alw_lower of the allowable torque Ctrq_alw based on the maximum interlinkage magnetic flux FLmax and on the adjusted maximum current Imax_adj received from the maximum current adjustment unit 51. As an example of obtaining the upper limit value Ctrq_alw_upper and the lower limit value Ctrg_alw_lower of the allowable torque, an example of tables is shown in FIG. 9 and FIG. 10. FIG. 9 is a table for obtaining the upper limit value Ctrq_alw_upper of the allowable torque. FIG. 10 is a table for obtaining the lower limit value Ctrq_alw_lower of the allowable torque. In FIG. 9 and FIG. 10, the horizontal axis represents the maximum interlinkage magnetic flux Flmax, and the vertical axis represents the adjusted maximum current Imax_adj. The allowable torque calculation unit 52 uses, for example, the tables of FIG. 9 and FIG. 10 to obtain the upper limit value Ctrq_alw_upper and the lower limit value Ctrq_alw_lower of the allowable torque, respectively.

Figure 11:
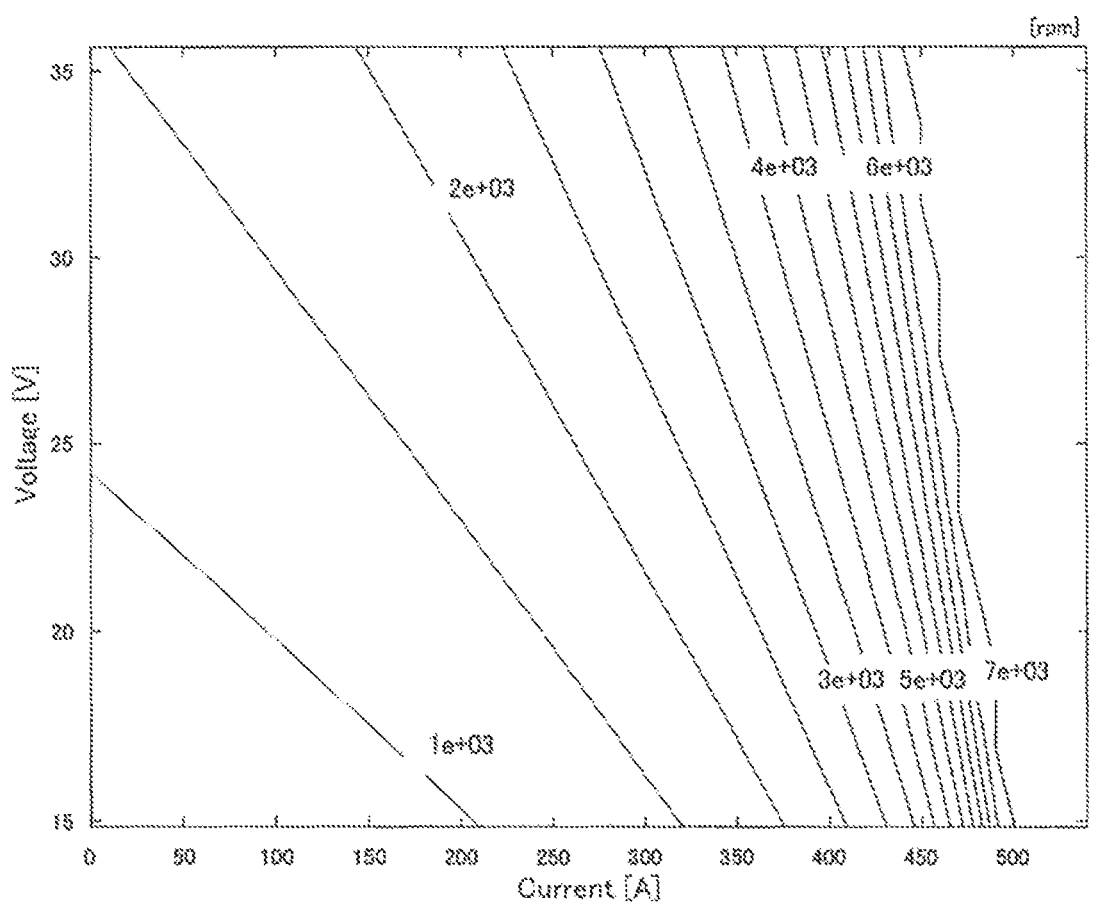
FIG. 11 is an explanatory table for showing a calculation method for an upper-limit number of rotations by an upper limit number-of-rotation calculation unit in the first embodiment of the present invention.

Similarly to the allowable torque calculation unit 52, the upper limit number-of-rotation calculation unit 53 first uses the DC voltage Vdc detected by the voltage detection unit 11 and the maximum modulation factor MFmax set in advance to calculate the maximum voltage Vmax based on an arithmetic expression of "Vmax=sqrt(3/2)×Vdc×(½)×MFmax". Then, the upper limit number-of-rotation calculation unit 53 obtains the upper-limit number of rotations Crot_lim based on the maximum voltage Vmax and on the adjusted maximum current Imax_adj received from the maximum current adjustment unit 51. As an example of obtaining the upper-limit number of rotations Crot_lim, an example of a table is shown in FIG. 11. In FIG. 11, the horizontal axis represents the adjusted maximum current Imax_adj, and the vertical axis represents the maximum voltage Vmax. The upper limit number-of-rotation calculation unit 53 uses, for example, the table of FIG. 11 to obtain the upper-limit number of rotations Crot_lim.

As described above, after the allowable torque calculation unit 52 and the upper limit number-of-rotation calculation unit 53 calculate the upper limit value Ctrq_alw_upper and the lower limit value Ctrq_alw_lower of the allowable torque, and the upper limit number-of-rotation Crot_lim, the control proceeds to Step S107.

In Step S107, the number-of-rotation adjustment unit 54 compares the upper-limit number of rotations Crot_lim calculated in Step S106 and the number of rotations Rot obtained in Step S103 with each other. When a relationship "Crot_lim>Rot" is satisfied, the number-of-rotation adjustment unit 54 determines that the number of rotations Rot is lower than the upper-limit number of rotations Crot_lim, and the control proceeds to Step S108. Meanwhile, when the relationship "Crot_lim>Rot" is not satisfied, the number-of-rotation adjustment unit 54 determines that the number of rotations Rot is equal to or higher than the upper-limit number of rotations Crot_lim, and the control proceeds to Step S112.

In Step S112, the number of rotations Rot has reached the upper-limit number of rotations Crot_lim, and hence the number-of-rotation adjustment unit 54 outputs a control command value for suppressing the number of rotations Rot. Description is given below of four control command values as examples.

As a first control command value, a torque control command value Ctrq_lim for setting the torque command to "0" is output to the torque command adjustment unit 55. When the torque command adjustment unit 55 receives the torque control command value Ctrq_lim from the number-of-rotation adjustment unit 54, the torque command adjustment unit 55 sets the adjusted torque command value Ctrq_adj to 0, and outputs the adjusted torque command value Ctrq_adj to the current command arithmetic unit 41. As a second control command value, a gear shift control command Csft for changing a gear ratio is output to a gear shift control unit included in an electronic control unit (ECU) of the vehicle. As a third control command value, a brake control command Cbrk is output to a brake control unit included in the ECU. Moreover, when the vehicle is a hybrid vehicle, as a fourth control command value, a fuel injection control command Cstp for stopping a fuel injection is output to a fuel injection control unit included in the ECU. The number of rotations Rot of the AC rotating electric machine 30 is suppressed by outputting at least one control command value of the four control command values.

In Step S108, the torque command adjustment unit 55 compares the upper limit value Ctrq_alw_upper of the allowable torque calculated in Step S106 and the torque command value Ctrq obtained in Step S102 with each other. When a relationship torque command value Ctrq>upper limit value Ctrg_alw_upper of allowable torque is satisfied, the torque command adjustment unit 55 determines that the torque command value Ctrq is higher than the upper limit value Ctrq_alw_upper of the allowable torque, and the control proceeds to Step S109. Meanwhile, when the relationship torque command value Ctrq>upper limit value Ctrq_alw_upper of allowable torque is not satisfied, the torque command adjustment unit 55 determines that the torque command value Ctrq is equal to or lower than the upper limit value Ctrq_alw_upper of the allowable torque, and the control proceeds to Step S110.

In Step S110, the torque command value Ctrq is not higher than the upper limit value Ctrq_alw_upper of the allowable torque, and hence the torque command adjustment unit 55 compares the lower limit value Ctrq_alw_lower of the allowable torque calculated in Step S106 and the torque command value Ctrq obtained in Step S102 with each other. When a relationship torque command value Ctrq<lower limit value Ctrg_alw_lower of allowable torque is satisfied, the torque command adjustment unit 55 determines that the torque command value Ctrq is lower than the lower limit value Ctrq_alw_lower of the allowable torque, and the control proceeds to Step S109. Meanwhile, when the relationship torque command value Ctrq<lower limit value Ctrq_alw_lower of allowable torque is not satisfied, the torque command adjustment unit 55 determines that the torque command value Ctrq is equal to or higher than the lower limit value Ctrq_alw_lower of the allowable torque, and the control proceeds to Step S111.

In Step S111, the torque command value Ctrq is not higher than the upper limit value Ctrq_alw_upper of the allowable torque, and is not lower than the lower limit value Ctrq_alw_ lower of the allowable torque, and the value kept unchanged of the torque command value Ctrq is thus output as the adjusted torque command value Ctrq_adj.

In Step S109, when it is determined that the torque command value Ctrq is higher than the upper limit value Ctrq_alw_upper of the allowable torque in Step S108, the torque command adjustment unit 55 adjusts the torque command value Ctrq by setting the Ctrq_adj to Ctrq_alw_upper. That is, the torque command adjustment unit 55 outputs the upper limit value Ctrq_alw_upper of the allowable torque as the adjusted torque command value Ctrq_adj. Meanwhile, when it is determined in Step S110 that the torque command value Ctrq is lower than the lower limit value Ctrq_alw_lower of the allowable torque, the torque command adjustment unit 55 adjusts the torque command value Ctrq by setting the Ctrq_adj to Ctrq_alw_lower. That is, the torque command adjustment unit 55 outputs the lower limit value Ctrq_alw_lower of the allowable torque as the adjusted torque command value Ctrq_adj.

Figure 2:
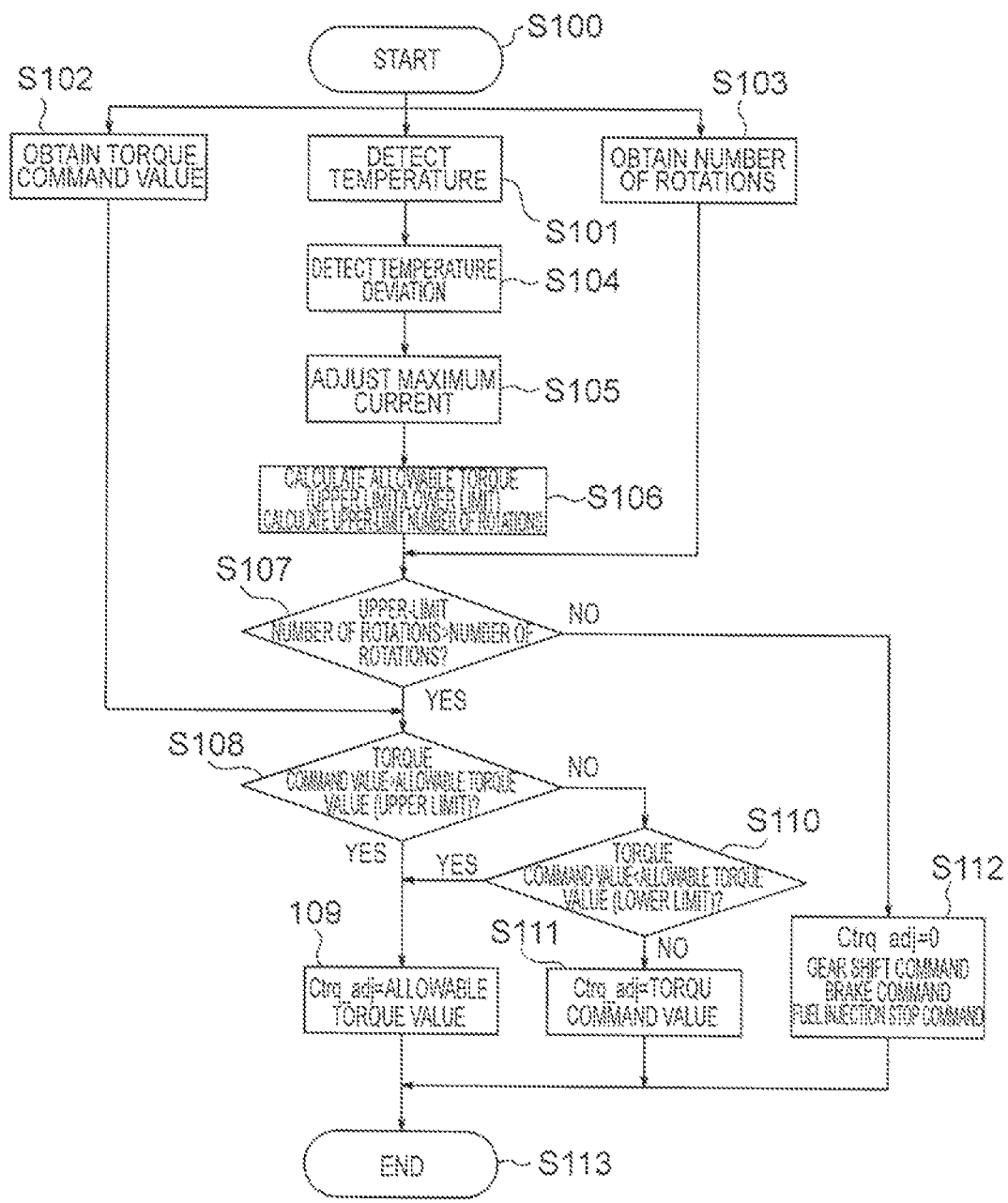
FIG. 2 is a flow chart for illustrating an operation of the control device for an AC rotating electric machine according to the first embodiment of the present invention.

The content of the flow chart of FIG. 2 is summarized as described below. In the control device for an AC rotating electric machine according to the first embodiment, first, the maximum current adjustment unit 51 adjusts the maximum current Imax so that the temperature of the protection part 70 does not exceed the set temperature based on the temperature of the protection part 70 detected by the temperature detection unit 50, and outputs the adjusted maximum current Imax_adj.

The allowable torque calculation unit 52 uses the tables of FIG. 9 and FIG. 10 to calculate the upper limit value and the lower limit value of the allowable torque based on the adjusted maximum current Imax_adj.

The upper limit number-of-rotation calculation unit 53 uses the table of FIG. 11 based on the adjusted maximum current Imax_adj to calculate the upper-limit number of rotations Crot_lim.

At this time, when the number of rotations Rot of the AC rotating electric machine 30 is higher than the upper-limit number of rotations Crot_lim, the number-of-rotation adjustment unit 54 outputs the torque control command value Ctrq_lim to the torque command adjustment unit 55 in order to suppress the number of rotations Rot. The torque command adjustment unit 55 receives the torque control command value Ctrq_lim, sets the adjusted torque command value Ctrq_adj to 0, and outputs the adjusted torque command value Ctrq_adj to the current command arithmetic unit 41.

Meanwhile, when the number of rotations Rot of the AC rotating electric machine 30 is equal to or lower than the upper-limit number of rotations Crot_lim, the torque command adjustment unit 55 sets the value of the adjusted torque command value Ctrq_adj as in the following cases (1) to (3).

(1) Torque command value>upper limit value of allowable torque

Ctrq_adj=Ctrq_alw_upper (2) Upper limit value of allowable torque Torque command value?Lower limit value of allowable torque Ctrq_adj=Ctrq (3) Torque command value<lower limit value of allowable torque Ctrq_adj=Ctrq_alw_lower As described above, in the first embodiment, the torque command value is not directly corrected, but the maximum current is adjusted. With this configuration, the allowable torque and the upper-limit number of rotations can be adjusted based on the value of the adjusted maximum current. Moreover, not only the allowable torque, but also the upper-limit number of rotations is adjusted, and hence the switching devices can reliably be protected.

In Patent Literature 1 given above, the torque command value is corrected. Therefore, in a high-rotation region, even when the torque command value is set to 0, it is required to cause the d-axis current to flow, and a current equal to or larger than a given current thus flows to the switching devices. Due to this current, the temperatures of the switching devices become temperatures equal to or higher than the set temperature, and the switching devices may thus break down. In the first embodiment, this problem is solved by the above-mentioned configuration, and the switching devices can reliably be prevented from breaking down due to the excessive heat.

Figure 16:
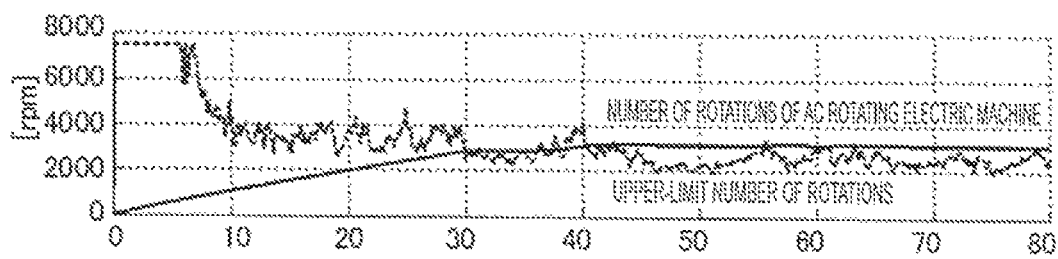
FIG. 16 is a graph for showing simulation results of the temperature of the protection part and the like obtained when the temperature control for the protection part was performed by adjusting the torque command value and the number of rotations in the hybrid vehicle in the control device according to the first embodiment of the present invention.
Figure 17:
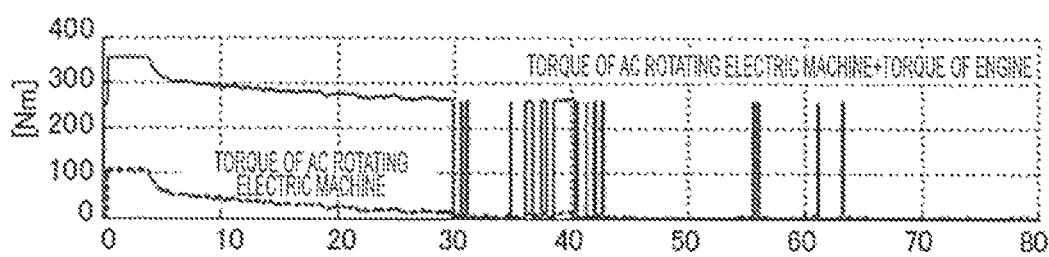
FIG. 17 is a graph for showing simulation results of the temperature of the protection part and the like obtained when the temperature control for the protection part was performed by adjusting the torque command value and the number of rotations in the hybrid vehicle in the control device according to the first embodiment of the present invention.
Figure 18:
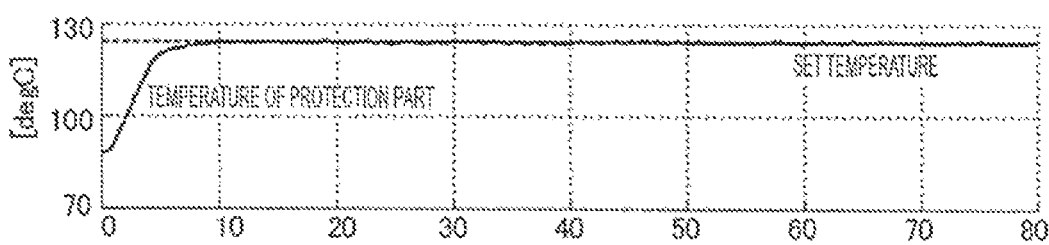
FIG. 18 is a graph for showing simulation results of the temperature of the protection part and the like obtained when the temperature control for the protection part was performed by adjusting the torque command value and the number of rotations in the hybrid vehicle in the control device according to the first embodiment of the present invention.
Figure 19:
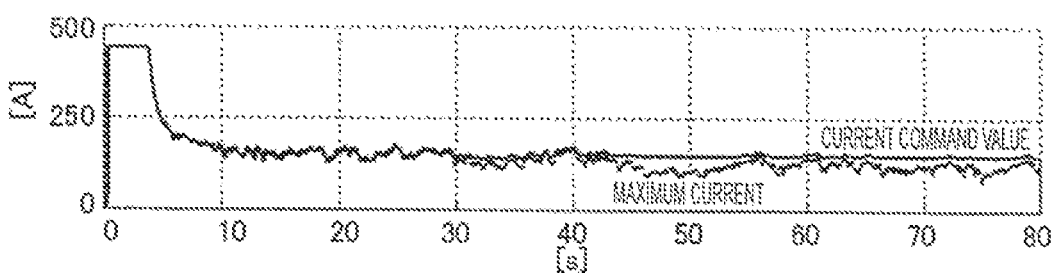
FIG. 19 is a graph for showing simulation results of the temperature of the protection part and the like obtained when the temperature control for the protection part was performed by adjusting the torque command value and the number of rotations in the hybrid vehicle in the control device according to the first embodiment of the present invention.

In FIG. 16 to FIG. 19, there are shown simulation results of the temperature of the protection part and the like obtained when the control device for an AC rotating electric machine according to the first embodiment performed the temperature control for the protection part 70 by adjusting the torque command value Ctrq and the number of rotations Rot in a hybrid vehicle. In FIG. 16 to FIG. 19, the horizontal axes represent time. Moreover, the vertical axis of FIG. 16 represents the number of rotations of the AC rotating electric machine 30. The vertical axis of FIG. 17 represents the torque of the AC rotating electric machine 30 and an engine torque. The vertical axis of FIG. 18 represents the detected temperature of the protection part 70. The vertical axis of FIG. 19 represents the current command value and the maximum current.

Before description of the simulation results of FIG. 16 to FIG. 19, referring to FIG. 12 to FIG. 15, description is given of simulation results in a related-art control device as a comparative example.

FIG. 12 to FIG. 15 are graphs for showing simulation results of the temperature of the protection part and the like obtained when the temperature control for the protection part 70 was performed by adjusting the torque command value in the hybrid vehicle in the related-art control device.

Figure 12:
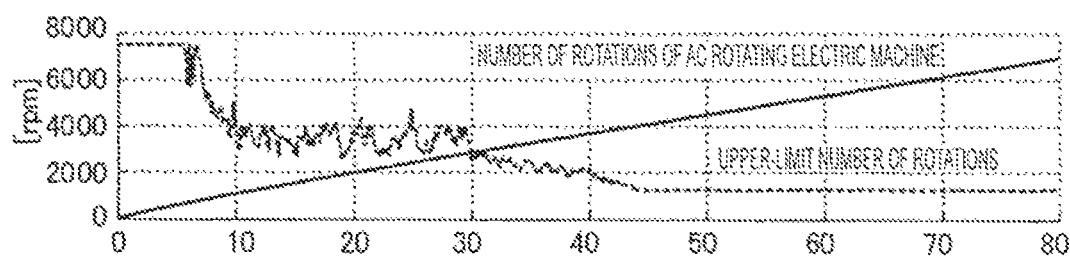
FIG. 12 is a graph for showing simulation results of the temperature of a protection part and the like obtained when temperature control for the protection part was performed by adjusting a torque command value in a hybrid vehicle in a related-art device.
Figure 13:
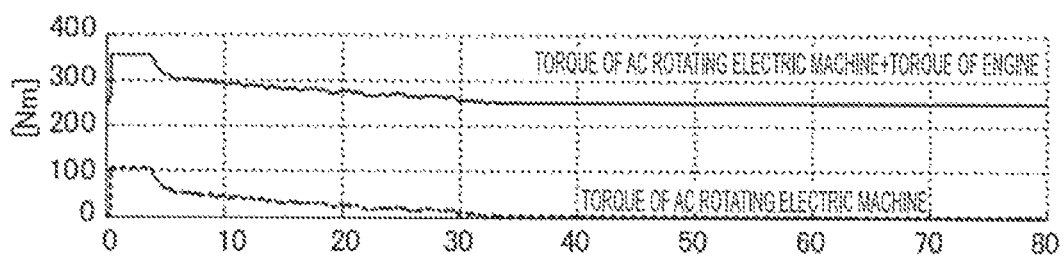
FIG. 13 is a graph for showing simulation results of the temperature of the protection part and the like obtained when the temperature control for the protection part was performed by adjusting the torque command value in the hybrid vehicle in the related-art device.
Figure 14:
FIG. 14 is a graph for showing simulation results of the temperature of the protection part and the like obtained when the temperature control for the protection part was performed by adjusting the torque command value in the hybrid vehicle in the related-art device.
Figure 15:
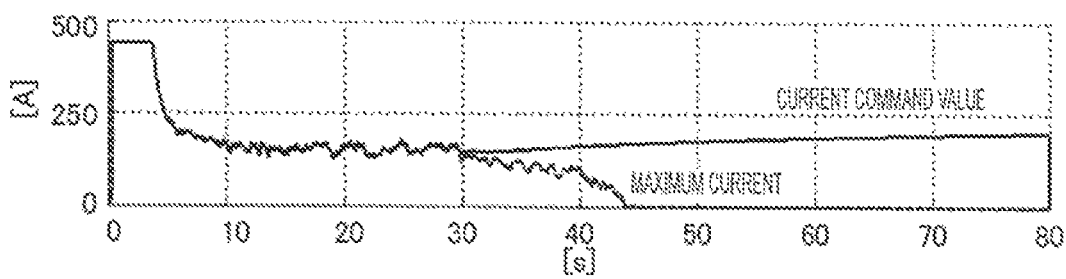
FIG. 15 is a graph for showing simulation results of the temperature of the protection part and the like obtained when the temperature control for the protection part was performed by adjusting the torque command value in the hybrid vehicle in the related-art device.

In FIG. 12 to FIG. 15, the horizontal axes represent time. Moreover, in FIG. 12, the vertical axis represents the number of rotations of the AC rotating electric machine. The vertical axis of FIG. 13 represents the torque of the AC rotating electric machine and the engine torque. The vertical axis of FIG. 14 represents the detected temperature of the protection part 70. The vertical axis of FIG. 15 represents the current command value and the maximum current.

In the simulation results obtained by the related-art control device shown in FIG. 12 to FIG. 15, as shown in FIG. 13, the torque of the AC rotating electric machine becomes maximum by maximum torque control immediately after a start, and, after that, the torque command value is suppressed by flux weakening control. Moreover, as shown in FIG. 14, the torque command value becomes 0 as a result of elimination of the deviation between the detected temperature of the protection part 70 and the set temperature, and, as shown in FIG. 13, the torque of the AC rotating electric machine also becomes "0". However, the engine torque is not suppressed, and, as shown in FIG. 12, the number of rotations of the AC rotating electric machine 30 thus continues to increase. As a result, as shown in FIG. 14, the detected temperature of the protection part 70 exceeds the set temperature due to a negative d-axis current by the flux weakening control.

In contrast, in the simulation results by the control device according to the first embodiment shown in FIG. 16 to FIG. 19, as shown in FIG. 17, the torque of the AC rotating electric machine becomes maximum by the maximum torque control immediately after the start, and, after that, the torque command value is suppressed by the flux weakening control. Moreover, the torque command value becomes 0 as a result of the elimination of the deviation between the detected temperature of the protection part 70 and the set temperature, and the torque of the AC rotating electric machine also becomes "0".

At this time, in the first embodiment, when the number of rotations Rot of the AC rotating electric machine 30 reaches the upper-limit number of rotations Crot_lim as shown in FIG. 16, by outputting the fuel injection control command Cstp for stopping the fuel injection to the fuel injection control, the engine torque is also brought to "0" as shown in FIG. 17, and the number of rotations Rot of the AC rotating electric machine 30 is suppressed as shown in FIG. 16. With this configuration, in the first embodiment, the negative d-axis current by the flux weakening control can be suppressed. As a result, as shown in FIG. 18, the detected temperature of the protection part 70 does not exceed the set temperature.

As apparent from the description given above, effects listed below are provided in the control device according to the first embodiment.

In the control device according to the first embodiment, the allowable torque and the upper-limit number of rotations are calculated by adjusting the maximum current based on the temperature detected by the temperature detection unit 50. Moreover, the temperature of the protection part 70 can be controlled by adjusting the torque command value and the number of rotations based on the calculated allowable torque and on the calculated upper-limit number of rotations. As a result, the switching devices can be prevented from breaking down due to the excessive heat.

Moreover, in the control device according to the first embodiment, the maximum current adjustment unit 51 adjusts the maximum current so that the temperature obtained from the temperature detection unit 50 does not exceed the set temperature set in advance, thereby the temperature of the protection part 70 can be controlled.

Moreover, in the control device according to the first embodiment, the allowable torque calculation unit 52 calculates the allowable torque based on the maximum current adjusted by the maximum current adjustment unit 51, on the DC voltage detected by the voltage detection unit 11, on the maximum modulation factor set in advance, and on the electric angular speed detected by the electric angular speed detection unit 32, thereby the temperature of the protection part 70 can be controlled.

Moreover, in the control device according to the first embodiment, the upper limit number-of-rotation calculation unit 53 calculates the upper-limit number of rotations based on the maximum current adjusted by the maximum current adjustment unit 51, on the DC voltage detected by the voltage detection unit 11, and on the maximum modulation factor set in advance, thereby the temperature of the protection part 70 can be controlled.

Moreover, in the control device according to the first embodiment, the number-of-rotation adjustment unit 54 outputs the gear shift command value to adjust the number of rotations of the AC rotating electric machine, thereby the temperature of the protection part 70 can be controlled.

Moreover, in the control device according to the first embodiment, the number-of-rotation adjustment unit 54 outputs a brake command value to adjust the number of rotations of the AC rotating electric machine, thereby the temperature of the protection part 70 can be controlled.

Moreover, in the control device according to the first embodiment, the number-of-rotation adjustment unit 54 adjusts the number of rotations of the AC rotating electric machine by outputting a fuel injection stop command value, thereby the temperature of the protection part 70 can be controlled.

Moreover, in the control device according to the first embodiment, the number-of-rotation adjustment unit 54 adjusts the number of rotations of the AC rotating electric machine by outputting the torque control command value, thereby the temperature of the protection part 70 can be controlled.

In the control device according to the first embodiment, when at least two protection parts 70 are provided, the maximum current adjustment unit 51 adjusts the maximum current based on the detected temperature of the protection part 70 most requiring the protection, thereby the temperatures of all of the protection parts 70 can be controlled.

Each of the functions of the control device according to the first embodiment described above is implemented by a processing circuit. The processing circuit for implementing each of the functions may be dedicated hardware, or a processor configured to execute a program stored in a memory.

When the processing circuit is dedicated hardware, the processing circuit corresponds to, for example, a single circuit, a composite circuit, a programmed processor, a parallel-programmed processor, an application specific integrated circuit (ASIC), a field programmable gate array (FPGA), or a combination thereof. The functions of the respective units including the inverter control unit 40, the maximum current adjustment unit 51, the allowable torque calculation unit 52, the upper limit number-of-rotation calculation unit 53, the number-of-rotation adjustment unit 54, and the torque command adjustment unit 55 may be implemented by individual processing circuits, or the functions of the respective units may together be implemented by a processing circuit.

Meanwhile, when the processing circuit is a processor, the function of each of the inverter control unit 40, the maximum current adjustment unit 51, the allowable torque calculation unit 52, the upper limit number-of-rotation calculation unit 53, the number-of-rotation adjustment unit 54, and the torque command adjustment unit 55 is implemented by software, firmware, or a combination of software and firmware. The software and the firmware are coded as programs and stored in a memory. The processor reads out and executes the program stored in the memory, to thereby implement the function of each of the units. That is, the control device includes a memory for storing program, and when the programs are executed by a processing circuit, there are consequently executed an inverter control step, a maximum current adjustment step, an allowable torque calculation step, an upper limit number-of-rotation calculation step, a number-of-rotation adjustment step, and a torque command adjustment step.

It is also understood that those programs cause a computer to execute procedures and methods for the respective units. In this case, the memory corresponds to, for example, a random access memory (RAM), a read only memory (ROM), a flash memory, an erasable programmable read only memory (EPROM), an electrically erasable and programmable read only memory (EEPROM), or other such non-volatile or volatile semiconductor memory. The memory also corresponds to, for example, a magnetic disk, a flexible disk, an optical disc, a compact disc, a MiniDisk, or a DVD.

Some of the functions of the respective units described above may be implemented by dedicated hardware, and other thereof may be implemented by software or firmware.

In this manner, the processing circuit can implement the function of each of the units described above by hardware, software, firmware, or a combination thereof.

INDUSTRIAL APPLICABILITY

The present invention is applicable in all industries that manufacture a control device for an AC rotating electric machine.

REFERENCE SIGNS LIST

10 DC power source, 11 voltage detection unit, 20 inverter, 21a, 21b, 21c upper-arm power semiconductor device, 22a, 22b, 22c lower-arm power semiconductor device, 30 AC rotating electric machine, 31 magnetic pole position detection unit, 32 electric angular speed detection unit, 33a, 33b, 33c current sensor, 40 inverter control unit, 41 current command arithmetic unit, 42 d-axis current adjuster, 43 q-axis current adjuster, 44 voltage coordinate converter, 45 PWM circuit, 46 gate driver, 47 current coordinate converter, 50 temperature detection unit, 51 maximum current adjustment unit, 52 allowable torque calculation unit, 53 upper limit number-of-rotation calculation unit, 54 number-of-rotation adjustment unit, 55 torque command adjustment unit, 60 proportional adjuster, 61 integral adjuster, 70 protection part

The invention claimed is:

1. A control device for an AC rotating electric machine, comprising:
   temperature detection circuitry configured to detect a temperature of a protection part, the temperature increasing in proportion to an increase in a temperature of a switching device of a power conversion circuit connected to the AC rotating electric machine;
   maximum current adjustment circuitry configured to adjust a maximum current of the AC rotating electric machine so as to prevent the temperature of the protection part detected by the temperature detection circuitry from exceeding a set temperature set in advance;
   allowable torque calculation circuitry configured to calculate an allowable torque based on the maximum current adjusted by the maximum current adjustment circuitry;
   torque command adjustment circuitry configured to adjust a torque command value directed to the AC rotating electric machine based on the allowable torque;
   upper limit number-of-rotation calculation circuitry configured to calculate an upper-limit number of rotations of the AC rotating electric machine based on the maximum current adjusted by the maximum current adjustment circuitry; and
   number-of-rotation adjustment circuitry configured to adjust the number of rotations of the AC rotating electric machine based on the upper-limit number of rotations.

2. The control device for an AC rotating electric machine according to claim 1, further comprising:
   a DC power source;
   voltage detection circuitry configured to detect a DC voltage of the DC power source; and
   electric angular speed detection circuitry configured to detect an electric angular speed of the AC rotating electric machine,
   wherein the allowable torque calculation circuitry is configured to:
     calculate a maximum voltage based on the DC voltage of the DC power source and on a maximum modulation factor set in advance;
     calculate a maximum interlinkage magnetic flux based on the maximum voltage and on the electric angular speed; and
     calculate the allowable torque based on the maximum interlinkage magnetic flux and on the maximum current adjusted by the maximum current adjustment circuitry.

3. The control device for an AC rotating electric machine according to claim 1, further comprising:
   a DC power source; and
   voltage detection circuitry configured to detect a DC voltage of the DC power source,
   wherein the upper limit number-of-rotation calculation circuitry is configured to:
     calculate a maximum voltage based on the DC voltage of the DC power source and on a maximum modulation factor set in advance; and
     calculate the upper-limit number of rotations based on the maximum voltage and on the maximum current adjusted by the maximum current adjustment circuitry.

4. The control device for an AC rotating electric machine according to claim 1, wherein the number-of-rotation adjustment circuitry is configured to:
   compare the number of rotations and the upper-limit number of rotations with each other; and
   adjust the number of rotations of the AC rotating electric machine by outputting a gear shift control command for changing to gear shift control when the number of rotations is equal to or higher than the upper-limit number of rotations.

5. The control device for an AC rotating electric machine according to claim 1, wherein the number-of-rotation adjustment circuitry is configured to:
   compare the number of rotations and the upper-limit number of rotations with each other; and
   adjust the number of rotations of the AC rotating electric machine by outputting a brake control command for performing brake control when the number of rotations is equal to or higher than the upper-limit number of rotations.

6. The control device for an AC rotating electric machine according to claim 1, wherein the number-of-rotation adjustment circuitry is configured to:
   compare the number of rotations and the upper-limit number of rotations with each other; and
   adjust the number of rotations of the AC rotating electric machine by outputting a fuel injection control command for stopping a fuel injection when the number of rotations is equal to or higher than the upper-limit number of rotations.

7. The control device for an AC rotating electric machine according to claim 1, wherein the number-of-rotation adjustment circuitry is configured to:
   compare the number of rotations and the upper-limit number of rotations with each other; and
   output, when the number of rotations is equal to or higher than the upper-limit number of rotations, a torque control command value for setting a torque command value to 0 to the torque command adjustment circuitry.

8. The control device for an AC rotating electric machine according to claim 1, wherein the torque command adjustment circuitry is configured to adjust the torque command value by:
- setting, when the number of rotations is lower than the upper-limit number of rotations and the torque command value is higher than an upper limit value of the allowable torque, the torque command value to the upper limit value of the allowable torque;
- setting, when the number of rotations is lower than the upper-limit number of rotations and the torque command value is lower than a lower limit value of the allowable torque, the torque command value to the lower limit value of the allowable torque; and
- keeping the torque command value unchanged when the number of rotations is lower than the upper-limit number of rotations and the torque command value is equal to or lower than the upper limit value of the allowable torque and is equal to or higher than the lower limit value of the allowable torque.

9. The control device for an AC rotating electric machine according to claim 1, wherein the maximum current adjustment circuitry is configured to:
- select, when two or more of the protection parts are provided, a protection part in which an absolute value of a temperature deviation between the detected temperature of the protection part and the set temperature is largest; and
- adjust the maximum current of the AC rotating electric machine so as to prevent the temperature of the selected protection part from exceeding the set temperature set in advance.

\* \* \* \* \*